UNITED STATES PATENT OFFICE.

FRITZ HOFMANN, CARL COUTELLE, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VULCANIZED CAOUTCHOUC-LIKE SUBSTANCE.

1,084,338.   Specification of Letters Patent.   Patented Jan. 13, 1914.

No Drawing.   Application filed March 20, 1911.   Serial No. 615,666.

*To all whom it may concern:*

Be it known that we, FRITZ HOFMANN, CARL COUTELLE, KONRAD DELBRÜCK, and KURT MEISENBURG, doctors of philosophy, chemists, citizens of the German Empire, residing at Elberfeld, Germany, have invented new and useful Improvements in Vulcanized Caoutchouc-like Substances, of which the following is a specification.

By earlier applications the production of new caoutchouc like substances is described, which are obtained by polymerizing mixtures of hydrocarbons of the erythrene series, such as erythrene, isoprene, alpha-methylerythrene, ethylerythrene, tri- and tetra-methylerythrenes, etc. It has now been found that these caoutchouc like substances can be vulcanized, substances being obtained equal to and some even better than vulcanized natural caoutchouc. These facts could not be foreseen in the existent state of knowledge with regard to the nature and the processes during the vulcanizing of caoutchouc. One could not know if these new caoutchouc-like substances too would show the same behavior to vulcanizing agents as the natural caoutchouc does. Still less could one predict, whether the vulcanized products, if they could be obtained at all, would have the same valuable properties of vulcanized caoutchouc.

In order to illustrate our invention the following examples are given, the parts being by weight:—

Example 1. 5 parts of the caoutchouc like substance obtained by the polymerization of a mixture of erythrene and isoprene are dissolved in 100 parts of benzene. A solution of one part of sulfur monochlorid ($S_2Cl_2$) in 50 parts of carbon disulfid $CS_2$ is added and the mixture is allowed to stand for 1.5 to 2 minutes, and is then poured into alcohol. On stirring a substance separates which is distinguished from the parent material by being of greater toughness and of better resistance to different agents. It is grayish in color and not adhesive.

Example 2. 50 parts of the caoutchouc like substance obtained by polymerization of a mixture of erythrene with beta-gamma-dimethylerythrene are intimately mixed by means of mixing rolls with 15 parts of powdered sulfur. The product shaped from the resulting sheet is then heated in a suitable apparatus for from 5 to 6 hours at 150–160° C.

Example 3. 100 parts of the product of polymerization obtained from isoprene and beta-gamma-dimethylerythrene are carefully worked together with 10 parts of sublimed sulfur in a mixing apparatus provided with rolls until a homogeneous mass results. The resulting product is brought into the desired shape and is then subjected in an iron vulcanizing vessel to the action of steam under a pressure of 3–4 atmospheres. After from 1–2 hours the process is complete.

Instead of the products of polymerization used in the examples a mixture of these caoutchouc like products with natural caoutchouc can be used; similarly other methods of vulcanization can be employed.

The novel vulcanized caoutchouc substances of the present invention form ozonids which upon decomposition with water yield a plurality of different oxygen-containing derivatives (aldehydes or ketones) of succinic aldehyde

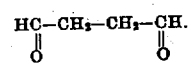

Thus the caoutchouc substance made from a mixture of isoprene and beta-gamma-dimethyl-erythrene, after vulcanization yields among the decomposition products of its ozonid obtained by boiling with water laevulinic aldehyde and acetonylacetone or the 1.4-dimethyl derivative of succinic aldehyde.

We claim:—

1. As a new product a vulcanized caoutchouc-like substance comprising the vulcanized polymerization product of a mixture or erythrene hydrocarbons being a grayish non-adhesive substance containing sulfur and forming ozonids which upon decomposition with water yield a plurality of different derivatives of succinic aldehyde.

2. As a new product a vulcanized caoutchouc-like substance comprising the vulcanized caoutchouc-like polymerization product of a mixture of erythrene hydrocarbons including isoprene being a grayish non-adhesive substance containing sulfur and forming ozonids which upon decomposition with water yield a plurality of different derivatives of succinic aldehyde which includes levulinic aldehyde.

3. As a new product a vulcanized caoutchouc-like substance comprising the vulcanized caoutchouc-like polymerization product of a mixture of erythrene hydrocarbons including diisopropenyl being a grayish non-adhesive substance containing sulfur and forming ozonids which upon decomposition with water yield a plurality of different derivatives of succinic aldehyde which includes acetonylacetone.

4. As a new product a vulcanized caoutchouc-like substance comprising a vulcanized mixture of natural caoutchoc and the caoutchouc-like polymerization product of a mixture of erythrene hydrocarbons being a grayish non-adhesive substance containing sulfur and forming ozonids which upon decomposition with water yield a plurality of different derivatives of succinic aldehyde.

5. As a new product a vulcanized caoutchouc-like substance comprising a vulcanized mixture of natural caoutchouc and the caoutchouc-like polymerization product of a mixture of erythrene hydrocarbons including isoprene being a grayish non-adhesive substance containing sulfur and forming ozonids which upon decomposition with water yield a plurality of different derivatives of succinic aldehyde which includes levulinic aldehyde.

In testimony whereof we have hereunto set our hands in the presence of two subscribing witnesses.

FRITZ HOFMANN. [L. S.]
 CARL COUTELLE. [L. S.]
 KONRAD DELBRÜCK. [L. S.]
 KURT MEISENBURG. [L. S.]

Witnesses:
 CHAS. J. WRIGHT,
 ALFRED HENKEL.

---

It is hereby certified that in Letters Patent No. 1,084,338, granted January 13, 1914, upon the application of Fritz Hofmann, Carl Coutelle, Konrad Delbrück and Kurt Meisenburg, of Elberfeld, Germany, for an improvement in "Vulcanized Caoutchouc-Like Substances", an error appears in the printed specification requiring correction as follows: Page 2, line 15, for the word "caoutchoc" read *caoutchouc*; and that the said Letters Patent should be read with this correction therein that the same may conform to the record of the case in the Patent Office.

Signed and sealed this 31st day of March, A. D., 1914.

[SEAL.]

J. T. NEWTON,
 *Acting Commissioner of Patents.* tives of succinic aldehyde which includes levulinic aldehyde.

3. As a new product a vulcanized caoutchouc-like substance comprising the vulcanized caoutchouc-like polymerization product of a mixture of erythrene hydrocarbons including diisopropenyl being a grayish non-adhesive substance containing sulfur and forming ozonids which upon decomposition with water yield a plurality of different derivatives of succinic aldehyde which includes acetonylacetone.

4. As a new product a vulcanized caoutchouc-like substance comprising a vulcanized mixture of natural caoutchoc and the caoutchouc-like polymerization product of a mixture of erythrene hydrocarbons being a grayish non-adhesive substance containing sulfur and forming ozonids which upon decomposition with water yield a plurality of different derivatives of succinic aldehyde.

5. As a new product a vulcanized caoutchouc-like substance comprising a vulcanized mixture of natural caoutchouc and the caoutchouc-like polymerization product of a mixture of erythrene hydrocarbons including isoprene being a grayish non-adhesive substance containing sulfur and forming ozonids which upon decomposition with water yield a plurality of different derivatives of succinic aldehyde which includes levulinic aldehyde.

In testimony whereof we have hereunto set our hands in the presence of two subscribing witnesses.

FRITZ HOFMANN. [L. S.]
CARL COUTELLE. [L. S.]
KONRAD DELBRÜCK. [L. S.]
KURT MEISENBURG. [L. S.]

Witnesses:
CHAS. J. WRIGHT,
ALFRED HENKEL.

---

Correction in Letters Patent No. 1,084,338.

It is hereby certified that in Letters Patent No. 1,084,338, granted January 13, 1914, upon the application of Fritz Hofmann, Carl Coutelle, Konrad Delbrück and Kurt Meisenburg, of Elberfeld, Germany, for an improvement in "Vulcanized Caoutchouc-Like Substances", an error appears in the printed specification requiring correction as follows: Page 2, line 15, for the word "caoutchoc" read *caoutchouc*; and that the said Letters Patent should be read with this correction therein that the same may conform to the record of the case in the Patent Office.

Signed and sealed this 31st day of March, A. D., 1914.

[SEAL.]

J. T. NEWTON,

*Acting Commissioner of Patents.*

It is hereby certified that in Letters Patent No. 1,084,338, granted January 13, 1914, upon the application of Fritz Hofmann, Carl Coutelle, Konrad Delbrück and Kurt Meisenburg, of Elberfeld, Germany, for an improvement in "Vulcanized Caoutchouc-Like Substances", an error appears in the printed specification requiring correction as follows: Page 2, line 15, for the word "caoutchoc" read *caoutchouc*; and that the said Letters Patent should be read with this correction therein that the same may conform to the record of the case in the Patent Office.

Signed and sealed this 31st day of March, A. D., 1914.

[SEAL.]

J. T. NEWTON,
*Acting Commissioner of Patents.*